US012610997B2

(12) United States Patent
Andrews et al.

(10) Patent No.: US 12,610,997 B2
(45) Date of Patent: Apr. 28, 2026

(54) APPARATUS AND METHOD OF MANUFACTURING MULTI-PIECE CLOSED-BACK ISOLATION GARMENTS

(71) Applicant: Curt G. Joa, Inc., Sheboygan Falls, WI (US)

(72) Inventors: Robert E. Andrews, Falmouth, MA (US); Samuel E. Darcy, Cleveland, WI (US); Scott A. Roehrborn, Sheboygan, WI (US); Jeffrey W. Fritz, Plymouth, WI (US)

(73) Assignee: CURT G. JOA, INC., Sheboygan Falls, WI (US)

( * ) Notice: Subject to any disclaimer, the term of this patent is extended or adjusted under 35 U.S.C. 154(b) by 0 days.

(21) Appl. No.: 18/567,331

(22) PCT Filed: May 24, 2022

(86) PCT No.: PCT/US2022/030785
§ 371 (c)(1),
(2) Date: Dec. 5, 2023

(87) PCT Pub. No.: WO2022/260858
PCT Pub. Date: Dec. 15, 2022

(65) Prior Publication Data
US 2024/0268500 A1 Aug. 15, 2024

Related U.S. Application Data

(60) Provisional application No. 63/202,452, filed on Jun. 11, 2021.

(51) Int. Cl.
*A41D 13/12* (2006.01)
*A41D 13/05* (2006.01)
(Continued)

(52) U.S. Cl.
CPC ......... *A41H 42/00* (2013.01); *A41D 13/0568* (2013.01); *A41D 13/12* (2013.01);
(Continued)

(58) Field of Classification Search
CPC ............... A41D 13/00; A41D 13/0002; A41D 13/0005; A41D 13/04; A41D 13/05;
(Continued)

(56) References Cited

U.S. PATENT DOCUMENTS

| | | | |
|---|---|---|---|
| D95,456 S | 4/1935 | Rosen | |
| 3,639,915 A | 2/1972 | Hrubecky | |

(Continued)

FOREIGN PATENT DOCUMENTS

| | | | |
|---|---|---|---|
| CA | 962641 A | * | 2/1975 |
| CN | 203762331 U | | 8/2014 |

(Continued)

OTHER PUBLICATIONS

FR-2171386-A1 English translation (Year: 1973).*
(Continued)

*Primary Examiner* — Michael A Tolin
(74) *Attorney, Agent, or Firm* — Quarles & Brady, LLP

(57) ABSTRACT

An apparatus for executing a method of manufacturing multi-piece open-back isolation garments (10) includes machinery for creating discrete torso web pieces (12) from a continuous torso web, combining the discrete torso pieces with a continuous shoulder web (14), and cutting the combined torso and shoulder web structure to form the isolation garments. The isolation garments may be used as protection from potentially hazardous or unclean materials in a variety of different environments.

12 Claims, 11 Drawing Sheets

(51) Int. Cl.

| | | |
|---|---|---|
| *A41H 42/00* | (2006.01) |
| *A41H 43/04* | (2006.01) |
| *B32B 37/22* | (2006.01) |
| *B32B 38/00* | (2006.01) |
| *B32B 38/18* | (2006.01) |
| *B32B 38/04* | (2006.01) |

(52) U.S. Cl.

CPC ............. *A41H 43/04* (2013.01); *B32B 37/22* (2013.01); *B32B 38/0004* (2013.01); *B32B 38/1858* (2013.01); *A41D 2400/52* (2013.01); *B32B 2038/047* (2013.01); *B32B 2437/00* (2013.01); *B32B 2571/00* (2013.01)

(58) Field of Classification Search

CPC ............ A41D 13/0512; A41D 13/0518; A41D 13/055; A41D 13/0556; A41D 13/0568; A41D 13/12; A41D 13/1209; A41D 13/1227; A41D 13/1236; A41D 13/1245; A41D 2400/52; A41H 42/00; A41H 43/00; A41H 43/02; A41H 43/0207; A41H 43/0214; A41H 43/0235; A41H 43/0242; A41H 43/025; A41H 43/0257; A41H 43/0271; A41H 43/0278; A41H 43/04; B32B 37/0076; B32B 37/02; B32B 37/12; B32B 37/1207; B32B 37/1284; B32B 37/1292; B32B 37/22; B32B 37/223; B32B 2037/1215; B32B 2037/1223; B32B 38/0004; B32B 38/18; B32B 38/1808; B32B 38/1858; B32B 2038/047; B32B 2038/1891; B32B 43/003; B32B 2437/00; B32B 2571/00

See application file for complete search history.

(56) References Cited

U.S. PATENT DOCUMENTS

| | | | |
|---|---|---|---|
| 3,699,591 | A | 10/1972 | Breitkopf et al. |
| 3,719,955 | A | 3/1973 | Hrubecky |
| 3,720,957 | A | 3/1973 | Patience |
| D236,293 | S | 8/1975 | Banks |
| 3,911,499 | A | 10/1975 | Benevento et al. |
| 4,052,752 | A | 10/1977 | Green |
| 4,382,303 | A | 5/1983 | Lunt |
| 4,535,481 | A | 8/1985 | Larson et al. |
| 4,608,719 | A | 9/1986 | Lunt |
| 4,646,365 | A | 3/1987 | Suprise |
| 4,829,602 | A | 5/1989 | Harreld et al. |
| 4,837,860 | A | 6/1989 | Roberts |
| 5,025,501 | A | 6/1991 | Dillon |
| 5,367,710 | A | 11/1994 | Karmin |
| 6,378,136 | B2 | 4/2002 | Matsushita |
| 6,830,543 | B2 | 12/2004 | Alberts et al. |
| D533,982 | S | 12/2006 | Graneto |
| 7,203,974 | B2 | 4/2007 | Jones et al. |
| D598,638 | S | 8/2009 | Graneto |
| D622,934 | S | 9/2010 | Graneto |
| 7,971,274 | B2 | 7/2011 | Graneto |
| D736,493 | S | 8/2015 | Pasko |
| D741,044 | S | 10/2015 | Pasko |
| 9,357,806 | B2 | 6/2016 | Terrell |
| D774,729 | S | 12/2016 | Pasko |
| D779,155 | S | 2/2017 | Pasko et al. |
| D779,156 | S | 2/2017 | Pasko |
| D785,284 | S | 5/2017 | Pasko |
| D787,780 | S | 5/2017 | Pasko et al. |
| D791,434 | S | 7/2017 | Pasko |
| D792,056 | S | 7/2017 | Reese et al. |
| 10,117,470 | B2 | 11/2018 | Reese et al. |

| | | | |
|---|---|---|---|
| D836,297 | S | 12/2018 | Pasko |
| 10,299,521 | B2 | 5/2019 | Wolf et al. |
| D863,727 | S | 10/2019 | Pasko |
| 10,441,011 | B2 | 10/2019 | Pasko et al. |
| 10,470,504 | B2 | 11/2019 | Pasko et al. |
| 10,470,506 | B2 | 11/2019 | Pasko |
| 10,835,423 | B2 | 11/2020 | Long et al. |
| 10,986,882 | B2 | 4/2021 | Johnson |
| 2001/0032346 | A1 | 10/2001 | Matsushita et al. |
| 2013/0091615 | A1 | 4/2013 | Pasko et al. |
| 2013/0191960 | A1 | 8/2013 | Pasko |
| 2013/0276204 | A1 | 10/2013 | Pasko et al. |
| 2013/0318682 | A1 | 12/2013 | Graneto, III |
| 2016/0066631 | A1 | 3/2016 | Pasko |
| 2018/0192713 | A1 | 7/2018 | Genender et al. |
| 2018/0213858 | A1 | 8/2018 | Malczyk |
| 2018/0296862 | A1 | 10/2018 | Johnson |
| 2018/0311514 | A1 | 11/2018 | Johnson |
| 2018/0343940 | A1 | 12/2018 | Genender et al. |
| 2019/0283389 | A1 | 9/2019 | Middlesworth |
| 2021/0008396 | A1 | 1/2021 | Johnson |
| 2021/0128366 | A1 | 5/2021 | Schneider |
| 2021/0169158 | A1 | 6/2021 | Mithani et al. |
| 2022/0087348 | A1 | 3/2022 | Terry et al. |
| 2023/0404197 | A1 | 12/2023 | Hagelqvist |
| 2024/0251890 | A1 | 8/2024 | Andrews et al. |
| 2024/0285005 | A1 | 8/2024 | Andrews et al. |
| 2024/0285012 | A1 | 8/2024 | Andrews et al. |

FOREIGN PATENT DOCUMENTS

| | | | |
|---|---|---|---|
| CN | 206365518 | U | 8/2017 |
| CN | 208286439 | U | 12/2018 |
| CN | 109862797 | A | 6/2019 |
| CN | 209090119 | U | 7/2019 |
| CN | 111513402 | A1 | 8/2020 |
| CN | 109171072 | B | 9/2020 |
| DE | 102011016497 | A1 | 10/2012 |
| DE | 202014103297 | U1 | 7/2014 |
| DE | 102015121421 | A1 | 4/2017 |
| EP | 490674 | | 10/1996 |
| EP | 2433601 | B1 | 5/2016 |
| FR | 2171386 | A1 * | 9/1973 |
| GB | 1352132 | A | 5/1974 |
| KR | 20110027385 | A | 3/2011 |
| KR | 2018012183 | A | 2/2018 |
| KR | 102023620 | B1 | 9/2019 |
| VN | 10022433 | B1 | 12/2019 |
| WO | 2022251075 | A1 | 12/2022 |
| WO | 2022251256 | A1 | 12/2022 |
| WO | 2022251260 | A1 | 12/2022 |
| WO | 2022260858 | A1 | 12/2022 |

OTHER PUBLICATIONS

International Search Report and Written Opinion issued in corresponding PCT Application No. US2022/030785, issued Sep. 9, 2022.

McKesson, "Endoscopy Procedure Gown X-Large Blue NonSterile AAMI Level 3 Disposable", (2021) https://mms.mckesson.com/product/841166/Welmed-9100-220XL.

McKesson, "Over-the-Head Protective Procedure Gown TIDIShield® One Size Fits Most Light Blue Non Sterile Disposable", (2021) https://mms.mckesson.com/product/820822/Tidi-Products-8575.

Molnlycke, "Barrier surgical gown Classic Urology", (Jun. 22, 2021) https://www.molnlycke.sg/products-solutions/barrier-surgical-gown-classic-urology/.

Welmed, "Thumb Loop Isolation Gown, Universal, Blue, Thumb Loop Wrists", (2021) https://welmed.us/infection-prevention/protective-apparel/isolation-gowns/thumb-loop-isolation-gown-universal-blue-thumb-loop-wrists/.

* cited by examiner

10

APPARATUS AND METHOD OF MANUFACTURING MULTI-PIECE CLOSED-BACK ISOLATION GARMENTS

CROSS REFERENCE TO RELATED APPLICATION

This application is the U.S. National Stage of PCT/US2022/030785 with international filing date of May 24, 2022, and which claims priority to U.S. Provisional Application No. 63/202,452 filed on June 2021, the contents of which are incorporated by reference in their entireties.

BACKGROUND OF THE INVENTION

Embodiments of the present invention relate to isolation garments and, more particularly, to multi-piece open-back isolation garments.

Isolation garments are useful in protecting the individuals wearing them from hostile environments. For example, hospital staff, patients, and visitors may wear isolation garments to avoid exposure to blood, other body fluids, and infectious materials or to protect patients, especially those with weakened immune systems, from infection. Also, individuals working in industrial facilities may wear isolation garments to prevent contact with hazardous chemicals. However, isolation garments may be worn in other conditions as well, especially in light of requirements imposed by some jurisdictions to prevent exposure to coronavirus disease 2019 (COVID-19). As an example, hair dressers or barbers may be required to wear isolation garments during their appointments.

Manufacturers produce isolation garments using a variety of different methods. In one method, an automated system combines material webs to construct a portion of an isolation garment. However, the product produced by the automated system does not include sleeves and is not folded. Thus, the isolation garments are finished by hand, with sleeves being sewn onto the initial product and then folded for packaging. This method results in a slow production speed and involves a high level of manual labor input.

Another method involves producing isolation garments using a sequential or non-continuous operation. That is, cutting the material webs, combining the webs, and folding of the webs are all performed at different stations. Therefore, the isolation garments must be constantly transferred between the stations in their various stages of production. Further, the combining of the webs and the folding and packaging of the resulting isolation garments is performed by hand. As such, this method is also slow and requires much manual labor.

Still another method that involves a high degree of manual input is one in which an individual cuts the shape of isolation garments out of one material web or out of a stack of material webs. The rest of the material web is discarded as scrap. Thereafter, the material webs are bonded, folded, and packaged manually. The end result is a plurality of isolation garments produced by a slow, manual method that produces a large amount of wasted raw material.

It would therefore be desirable to provide an apparatus and method of manufacturing isolation garments that can produce isolation garments quickly and do not depend on a high level of manual input or result in a large amount of raw material scrap.

BRIEF STATEMENT OF THE INVENTION

In accordance with one aspect of the invention, an apparatus for manufacturing multi-piece open-back isolation garments includes a bonding unit configured to create underarm seams between first shoulder web panels and second shoulder web panels overlapping each other in a continuous shoulder web, a torso cutting unit configured to cut discrete torso web pieces from a continuous torso web, and an applicator configured to apply a coupling material onto at least one of the first shoulder panels of the continuous shoulder web and the discrete torso pieces. The apparatus additionally includes a transfer unit configured to transfer the discrete torso web pieces onto the coupling material on the first shoulder web panels of the continuous shoulder web, the coupling material bonding the discrete torso web pieces to the first shoulder web panels of the continuous shoulder web to create a continuous isolation garment web.

In accordance with another aspect of the invention, a method of manufacturing multi-piece open-back isolation garments includes forming first shoulder web panels and second shoulder web panels overlapping each other in a continuous shoulder web and creating underarm seams between the first and second shoulder web panels. The method also includes cutting a continuous torso web into discrete torso web pieces, applying a coupling material to at least one of the first shoulder web panels and the discrete torso web pieces, and transferring the discrete torso web pieces onto the coupling material on the first shoulder web panels to bond the discrete torso web pieces to the first shoulder web panels and create a continuous isolation garment web.

In accordance with yet another aspect of the invention, a multi-piece garment includes a shoulder web piece having first and second shoulder web panels each comprising a bottom edge and a pair of underarm edges extending out from the bottom edge, a pair of underarm seams joining the first and second shoulder web panels at adjacent underarm edges of the first and second shoulder web panels to form first and second sleeves in the shoulder web piece, and a neck opening formed in the first and second shoulder web panels across from the bottom edges of the first and second shoulder web panels. The multi-piece garment further includes a torso web piece overlapping the first shoulder web panel of the shoulder web piece, the torso web piece bonded to the first shoulder web panel via a coupling material positioned between a top edge of the torso web piece and the bottom edge of the first shoulder web panel.

Various other features and advantages of the present invention will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Embodiments of the present invention provide for an apparatus and method of manufacturing multi-piece open-back isolation garments. In executing the method of manufacturing, the apparatus utilizes a series of cutting, folding, bonding, and transfer units. These units operate together to create discrete torso web pieces from a continuous torso web, combine the discrete torso pieces with at least one continuous shoulder web, cut the combined torso and shoulder web structure to form the multi-piece open-back isolation garments, and fold or roll up the multi-piece open-back isolation garments for packaging. The multi-piece open-back isolation garments may be used in a variety of environments such as, for example, as isolation gowns in medical environments, as an alternative to coveralls in industrial environments, and any other environments in which isolation from potentially hazardous or unclean materials or other individuals is desired. Thus, while referred to hereafter as "isolation gowns," it is contemplated that the garments described herein may be manufactured for use outside of the healthcare industry.

Figure 1A:
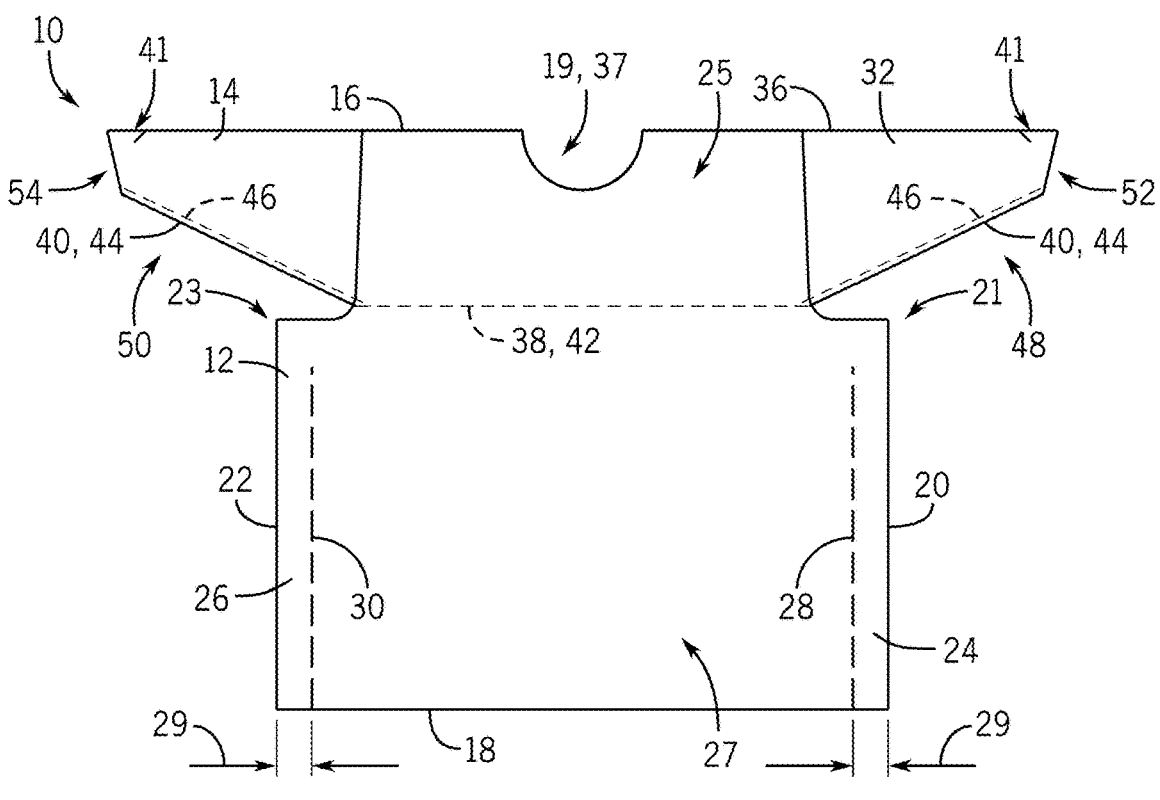
FIGS. 1A, 1C, 1D and 1E are front views of a multi-piece open-back isolation garment, according to embodiments of the invention.
Figure 1B:
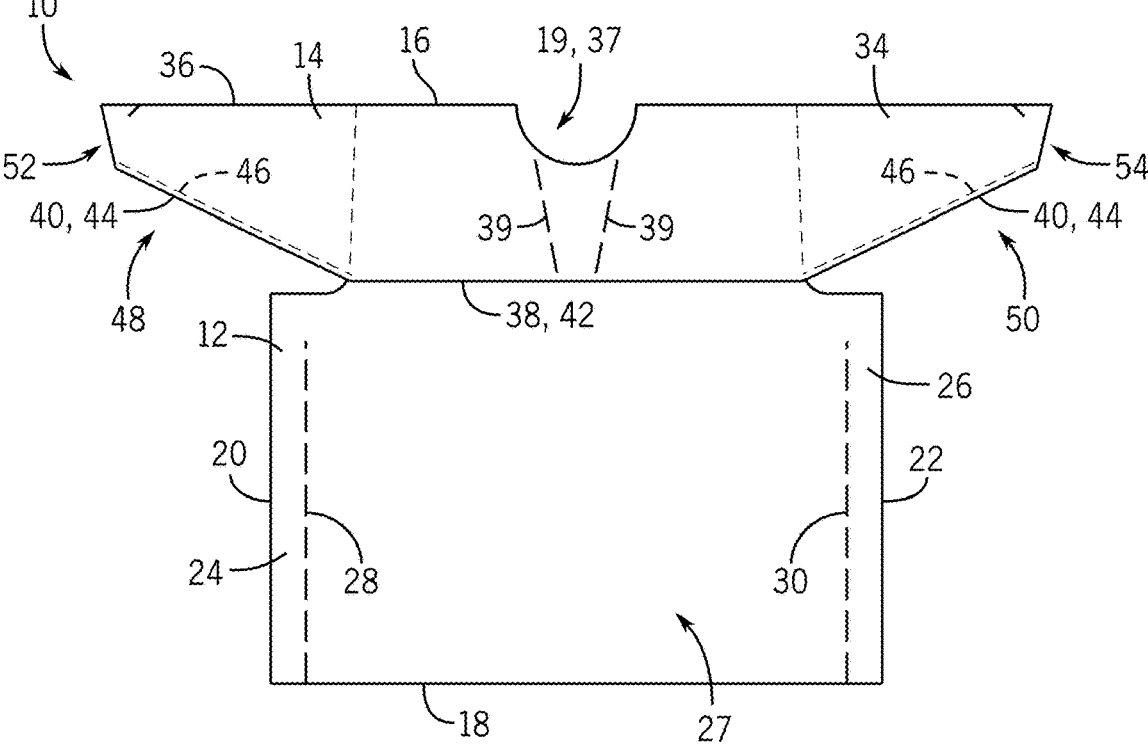
FIG. 1B is a rear view of the multi-piece open-back isolation garment of FIG. 1A.
Figure 1C:
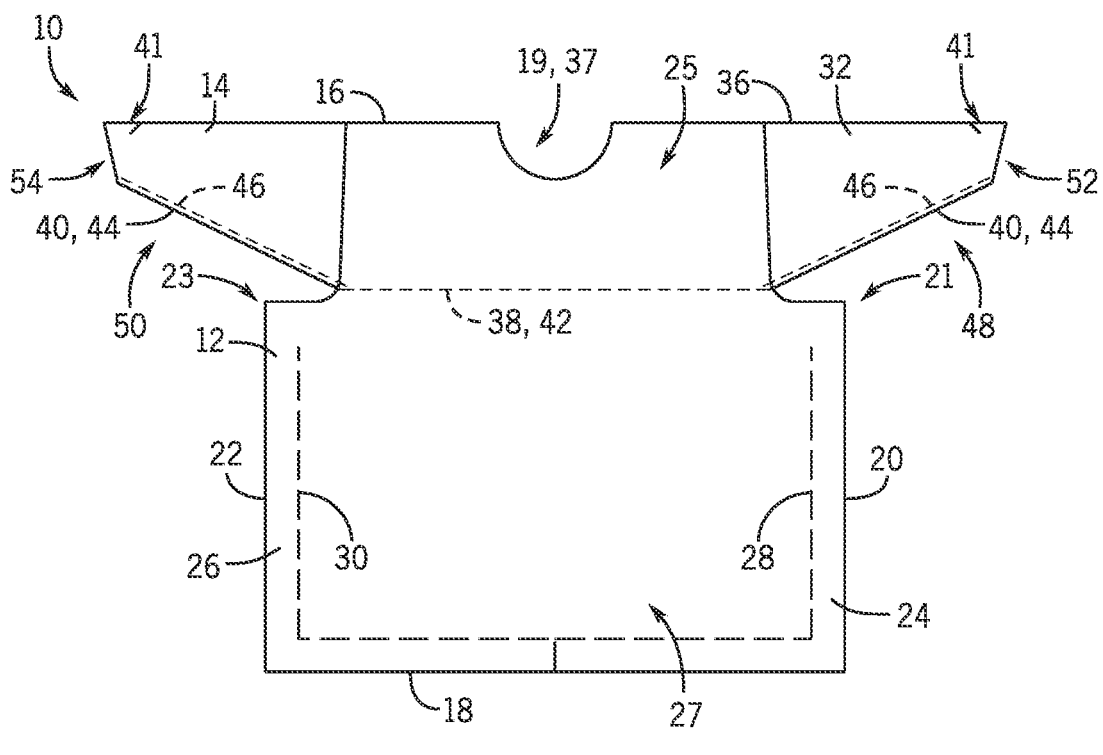
Figure 1D:
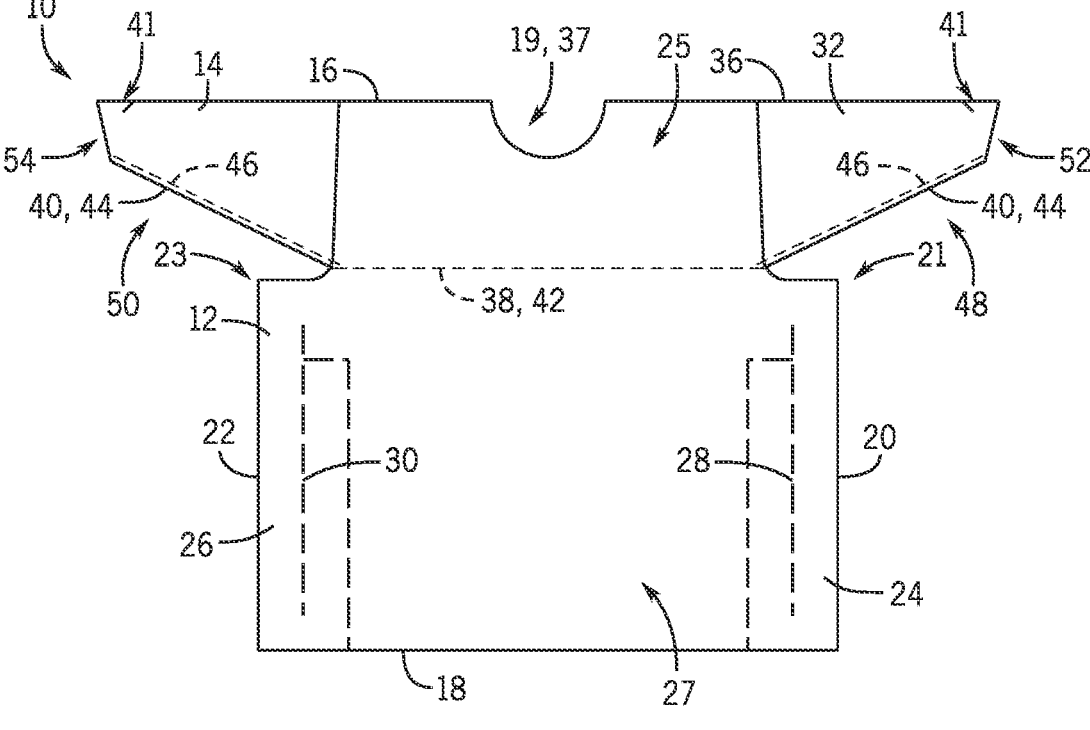
Figure 1E:
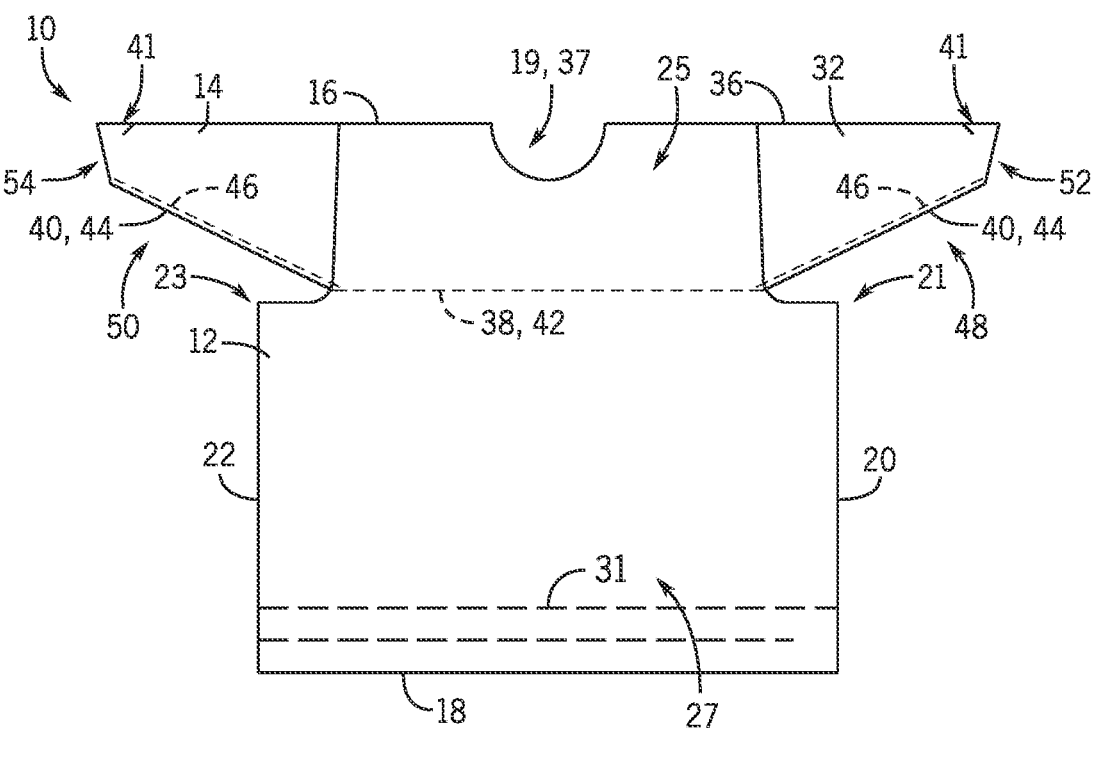
Figure 2:
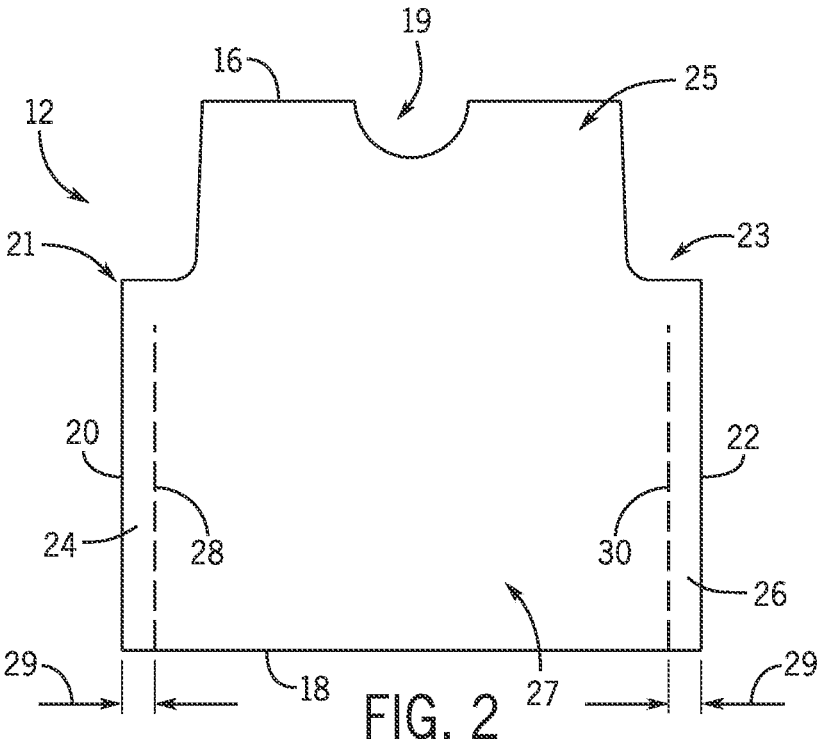
FIG. 2 is a rear view of the torso web piece of the multi-piece open-back isolation garment of FIG. 1A, according to an embodiment of the invention.
Figure 3:
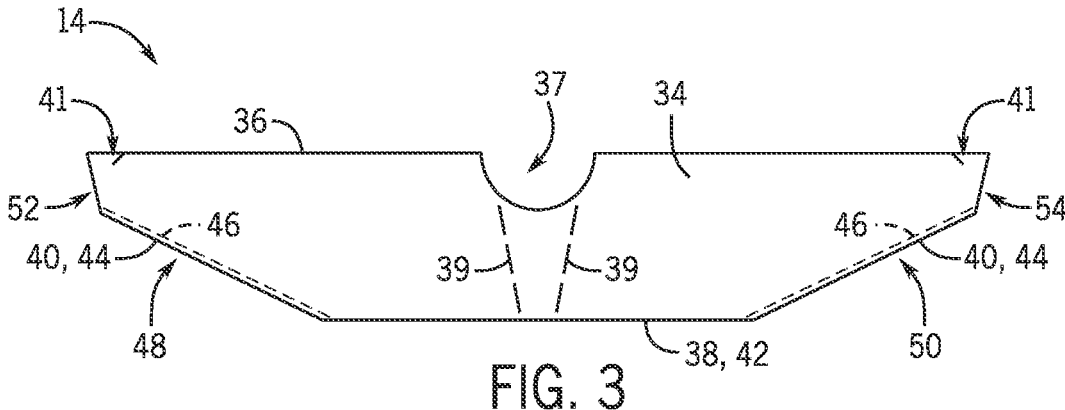
FIG. 3 is a rear view of the shoulder web piece of the multi-piece open-back isolation garment of FIGS. 1A-1E, in a folded condition, according to an embodiment of the invention.
Figure 4:
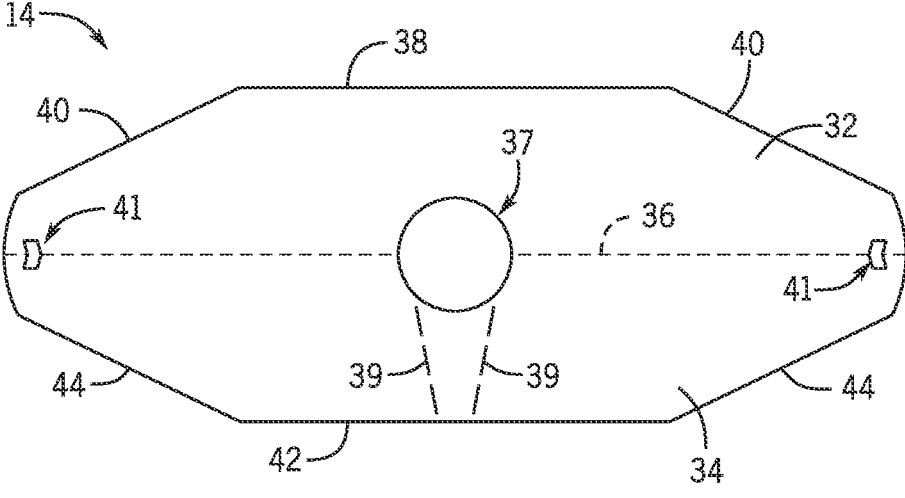
FIG. 4 is a top view of the shoulder web piece of the multi-piece open-back isolation garment of FIGS. 1A-1E, in an unfolded and unbonded condition, according to an embodiment of the invention.

Referring to FIGS. 1A-4, a multi-piece open-back isolation gown 10 and its torso and shoulder web pieces 12, 14 are shown, according to an embodiment of the invention. FIGS. 1A-1B illustrate front and rear views of multi-piece open-back isolation gown 10. FIGS. 1C-1D illustrate front views of multi-piece open-back isolation gown 10 with alternative tie strap designs. FIG. 2 illustrates a rear view of torso web piece 12 of isolation gown 10 in FIGS. 1A and 1B. FIG. 3 illustrates a rear view of shoulder web piece 14 in a folded condition. FIG. 4 illustrates a top view of shoulder web piece 14 in an unfolded and unbonded condition. Torso and shoulder web pieces 12, 14 of isolation gown 10 may be formed of nonwoven materials, woven materials, films, foams, and/or composites or laminates of any of these material types.

As shown in FIGS. 1A-1E and 2, torso web piece 12 includes a top edge 16, a bottom edge 18, and left side and right side edges 20, 22 extending between top and bottom edges 16, 18, with references to the left and right sides being from the perspective of the wearer of isolation gown 10. Top edge 16 includes a neck opening 19. Each of side edges 20, 22 includes a respective extended area 21, 23 such that, as side edges 20, 22 extend from top edge 16 to bottom edge

18, torso web piece 12 increases in width. As such, torso web piece 12 is wider at bottom edge 18 than at top edge 16. This construction creates a narrower upper portion 25 of torso web piece 12 and a wider lower portion 27 of torso web piece 12. However, in various embodiments, torso web piece 12 may have a different construction resulting from a different number and/or arrangement of edges.

As shown in FIGS. 1A, 1B, and 2, torso web piece 12 further includes two optional tie straps 24, 26 along left and right side edges 20, 22 in extended areas 21, 23. Tie straps 24, 26 may be separated from the rest of torso web piece 12 along perforation lines 28, 30 spaced apart from left and right side edges 20, 22, respectively. Perforation lines 28, 30 maintain an approximately constant distance 29 from left and right side edges 20, 22, respectively, while extending from bottom edge 18 toward top edge 16. As shown, perforation lines 28, 30 do not extend the entire length of extended areas 21, 23. As such, tie straps 24, 26 remain integrated with torso web piece 12 in lower portion 27 of torso web piece 12. Tie straps 24, 26 may then be pulled back by a wearer of isolation gown 10 in order to keep isolation gown 10 close to the wearer and further prevent contact with possibly unsafe substances.

While FIGS. 1A, 1B, and 2 show torso web piece 12 with two tie straps 24, 26 extending down to bottom edge 18 at side edges 20, 22, torso web piece 12 may include different tie strap configurations resulting from different perforation line configurations. As a non-limiting example, perforation lines 28, 30 may stop short of bottom edge 18 and extend away from side edges 20, 22, respectively, before extending down to bottom edge 18 such that tie straps 24, 26 are lengthened along bottom edge 18 as shown in FIG. 1C. As another non-limiting example, perforation lines 28, 30 may be arranged on torso web piece 12 such that tie straps 24, 26 extend down side edges 20, 22 and then wind back up toward top edge 16 in order to lengthen tie straps 24, 26 as shown in FIG. 1D. As yet another non-limiting example, perforation lines 28, 30 may be replaced by at least one perforation line 31 extending along torso web piece 12 near bottom edge 18 in order to perforate a single tie strap along bottom edge 18 as shown in FIG. 1E. In that case, the single tie strap may be completely separable from torso web piece 12 such that wearers of isolation gown 10 can wrap the separated tie strap around their waists and tie it in position. In yet other alternative embodiments, tie straps may be omitted from the integrated structure of the multi-piece open-back isolation gown 10 entirely and separately packaged with gown 10.

As shown in FIGS. 1A-1E, 3, and 4, shoulder web piece 14 of isolation gown 10 includes overlapping front and rear shoulder web panels 32, 34. In multi-piece open-back isolation gown 10, front and rear shoulder web panels 32, 34 share a folded top edge 36. However, front and rear shoulder web panels 32, 34 may also be formed from two discrete shoulder web panels with separate top edges (not shown) in an alternative embodiment. In that case, shoulder web piece 14 would include a seam (not shown) between shoulder web panels 32, 34 adjacent the two top edges. Regardless, top edge 36 includes a substantially centralized neck opening 37.

Shoulder web piece 14 may also include one or multiple optional neck perforation lines 39 that extend down from neck opening 37 on rear shoulder web panel 34 such that a wearer of isolation gown 10 is able to tear out a portion of rear shoulder web panel 34 to make neck opening 37 larger or to completely tear rear shoulder web panel 34 apart. Tearing apart rear shoulder web panel 34 may aid wearer in removing isolation gown 10 without being contaminated by a substance that landed on isolation gown 10 during a medical procedure or industrial activity, as non-limiting examples. A larger neck opening 37 may make a wearer more comfortable while wearing isolation gown 10. In addition, shoulder web piece 14 may also include optional thumb openings or holes 41 along top edge 36 in order to allow wearers of isolation gown 10 to insert their thumbs therethrough and have greater control over the movement of isolation gown 10.

Front shoulder web panel 32 includes a front bottom edge 38 and two front underarm edges 40 extending from front bottom edge 38 toward top edge 36, and rear shoulder web panel 34 includes a rear bottom edge 42 and two rear underarm edges 44 extending from rear bottom edge 42 toward top edge 36 at approximately the same angle as front underarm edges 40. As shown in FIGS. 1A-1E and 3, front and bottom surfaces 38, 42 and front and rear underarm edges 40, 44 are substantially aligned with each other when shoulder web piece is folded. However, in various embodiments, front and bottom surfaces 38, 42 and/or front and rear underarm edges 40, 44 may be offset from each other. Regardless, shoulder web piece 14 includes underarm seams 46 joining front and rear shoulder web panels 32, 34 at adjacent front and rear underarm edges 40, 44. Underarm seams 46 may be created using a variety of different bonding techniques that attach together two or more material layers such as thermal, ultrasonic, pressure, or adhesive bonding techniques and various other forms of bonding known in the industry. In any case, underarm seams 46 create left and right sleeves 48, 50 in shoulder web pieces 14. Left and right sleeves 48, 50 include respective left and right wrist openings 52, 54 defined between underarm seams 46 and top edge 36. Wrist openings 52, 54 may be square, rectangular, triangular, circular, or any other shape, as dictated by design specifications.

Figure 5:
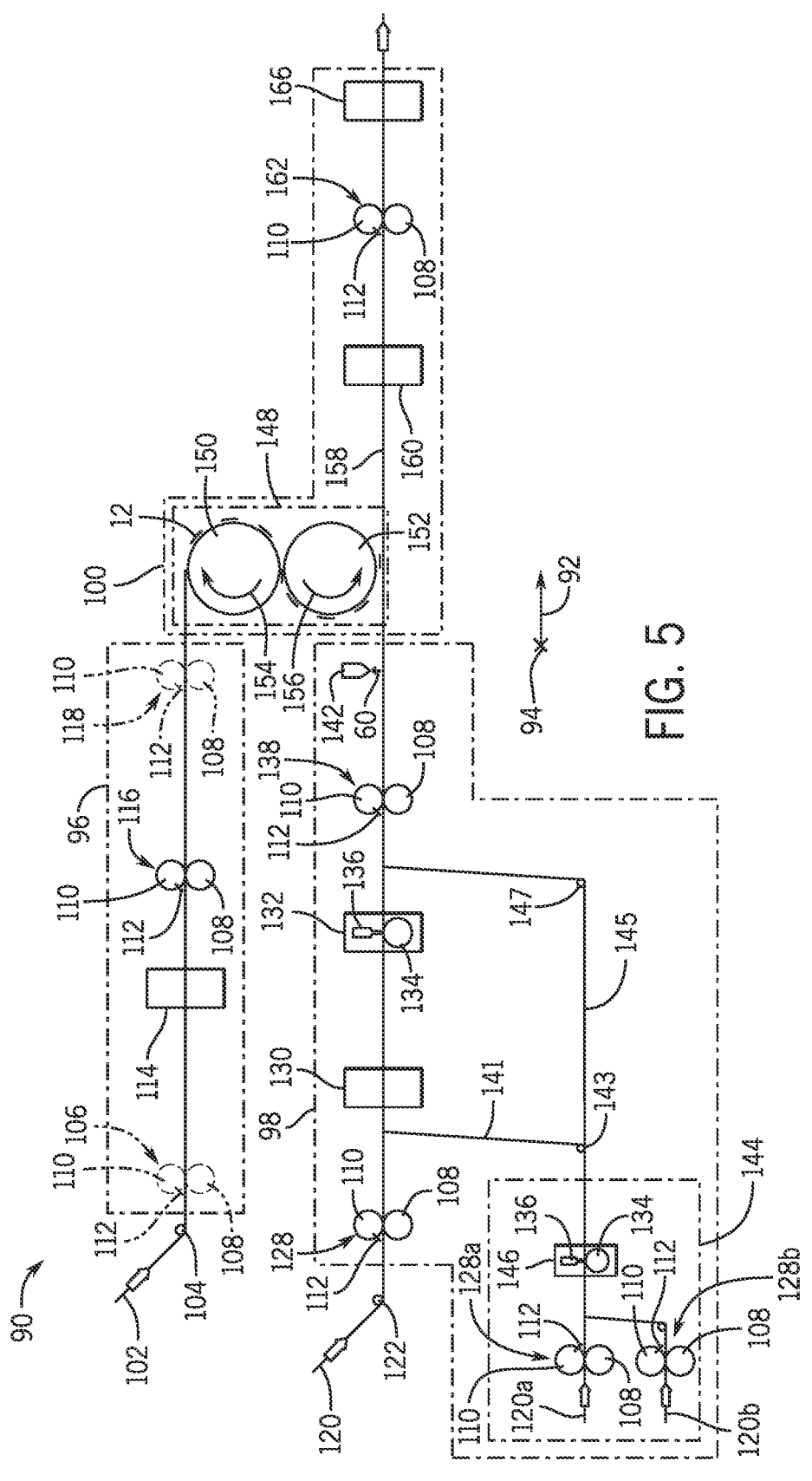
FIGS. 5 and 6 are schematic views of a portion of a manufacturing line and associated production flow for forming multi-piece open-back isolation garments, according an embodiment of the invention.
Figure 6:
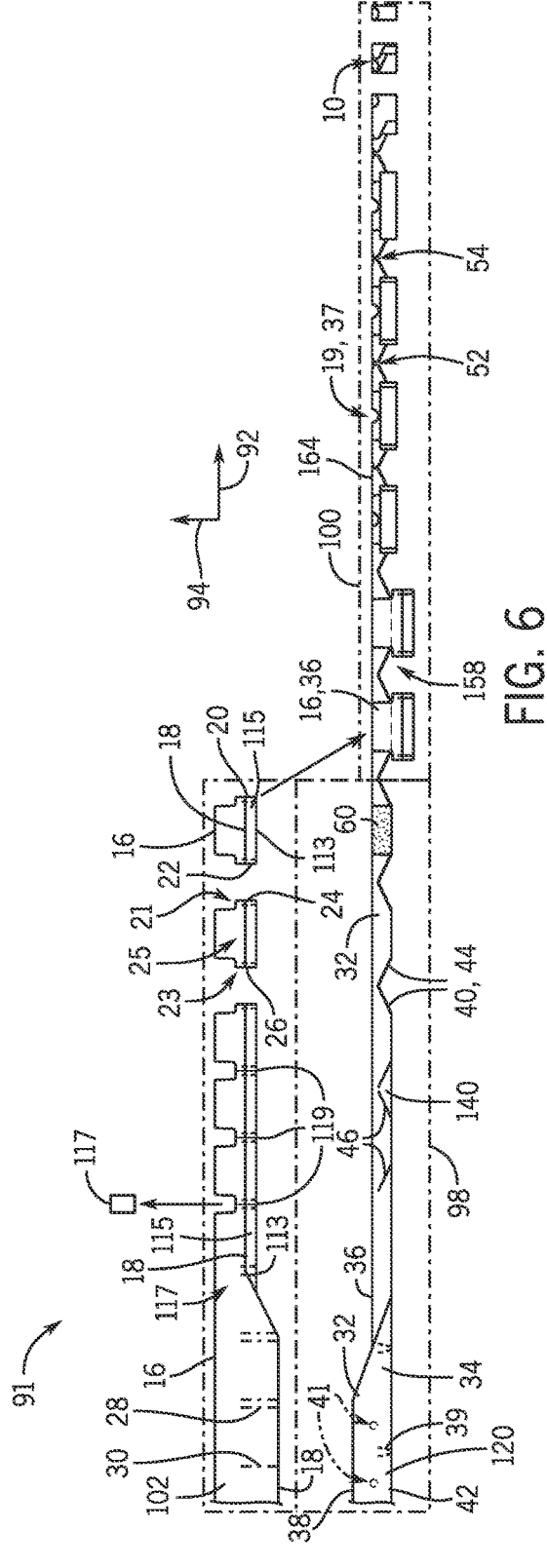
Figure 7:
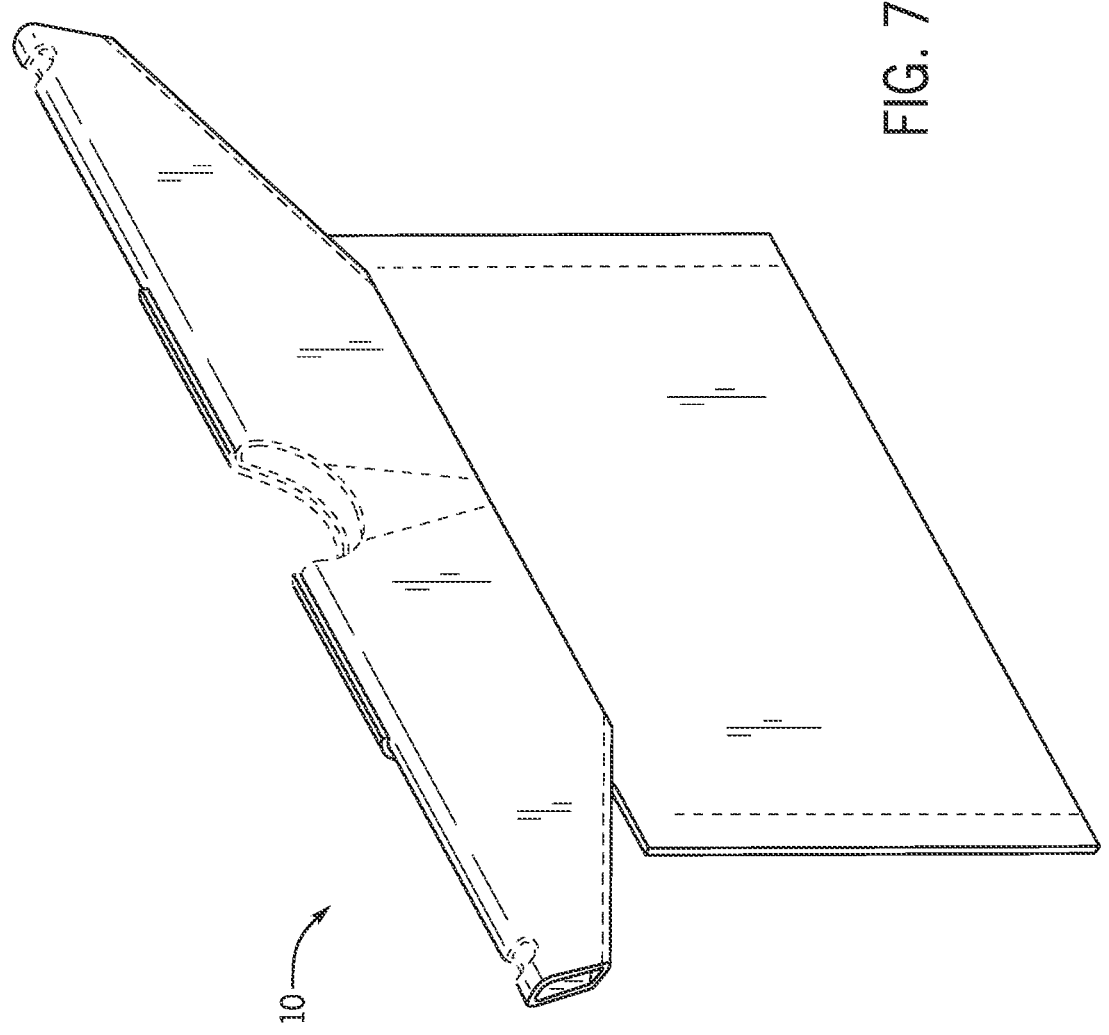
FIG. 7 is a rear perspective view of a multi-piece open-back isolation garment, according to an embodiment of the invention.
Figure 8:
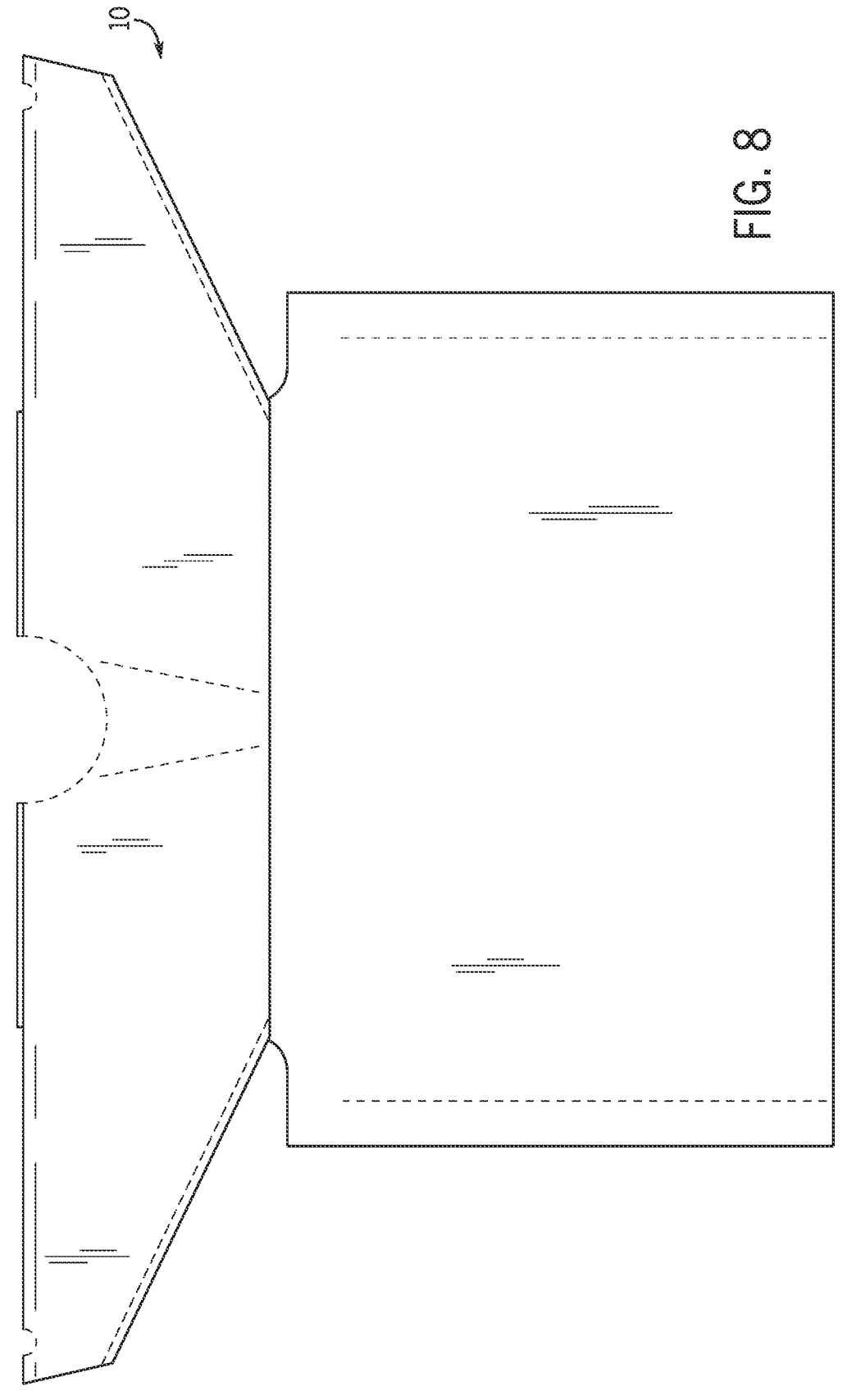
FIG. 8 is a rear view of the multi-piece open-back isolation garment of FIG. 7.
Figure 9:
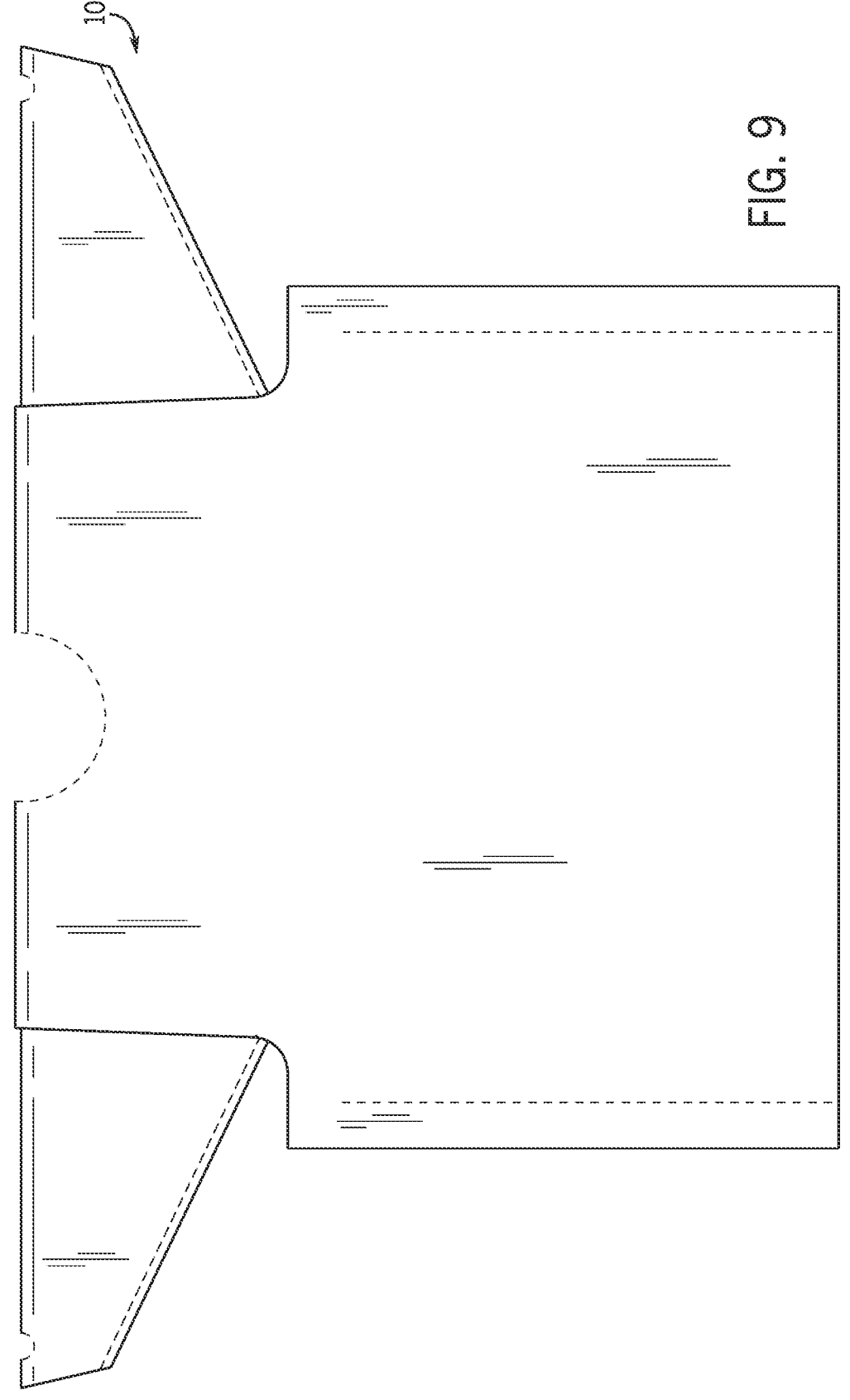
FIG. 9 is a front view of the multi-piece open-back isolation garment of FIG. 7.
Figure 11:
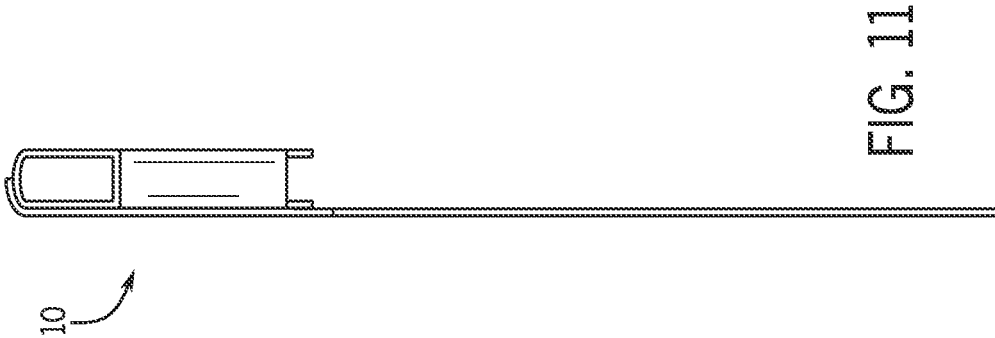
FIG. 11 is a left side view of the multi-piece open-back isolation garment of FIG. 7.
Figure 10:
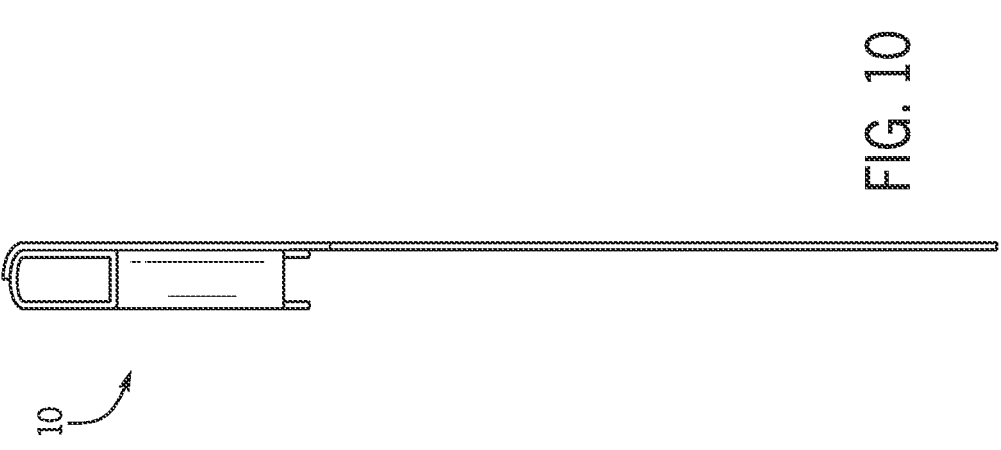
FIG. 10 is a right side view of the multi-piece open-back isolation garment of FIG. 7.
Figures 12, 13:
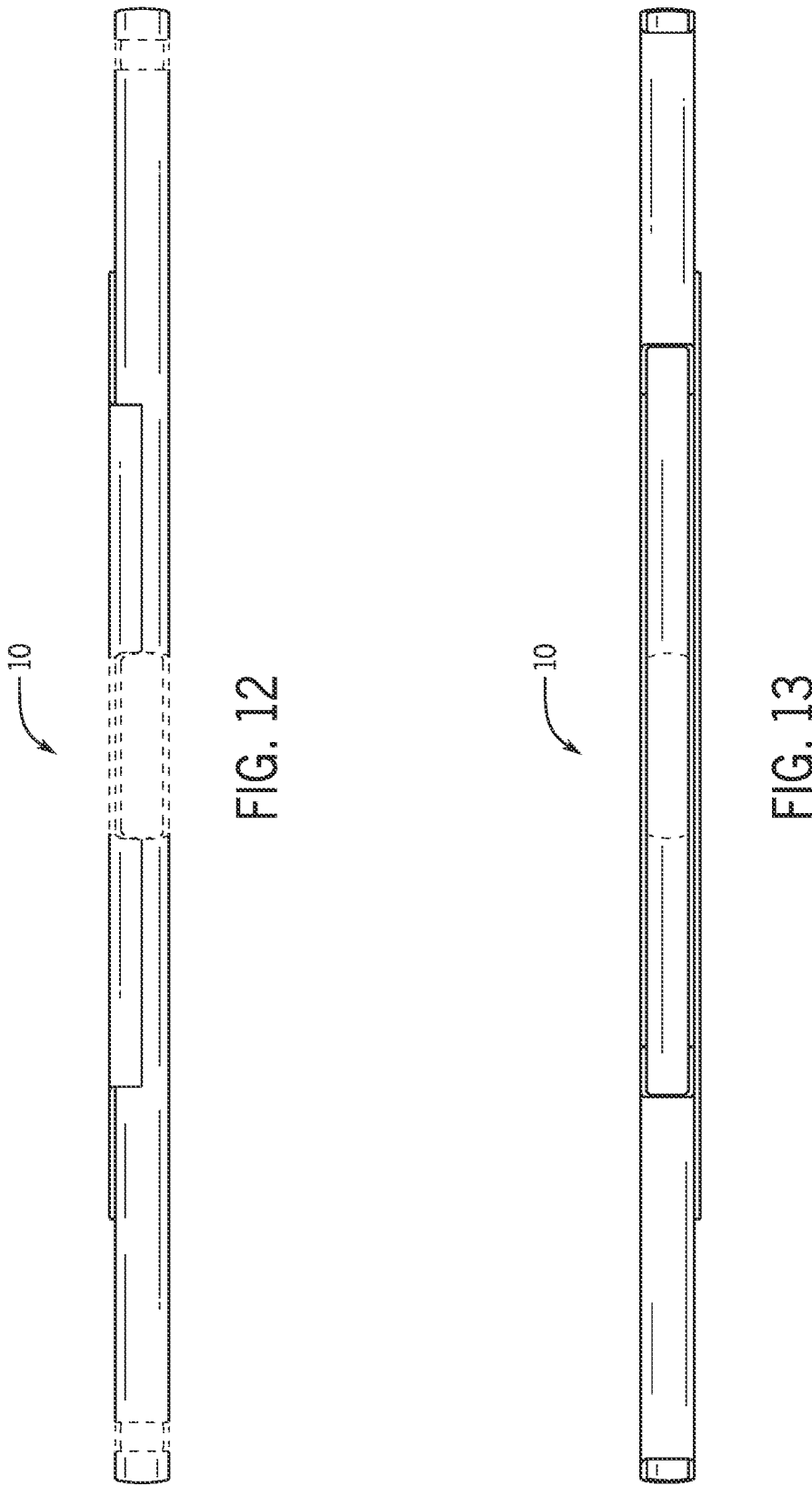
FIG. 12 is a top view of the multi-piece open-back isolation garment of FIG. 7.
FIG. 13 is a bottom view of the multi-piece open-back isolation garment of FIG. 7.

As shown in FIGS. 1A-1E, torso web piece 12 and shoulder web piece 14 overlap each other and are bonded to each other via coupling material or bonding agent 60 (see FIG. 6) to create multi-piece open-back isolation gown 10, as described and shown in more detail with respect to FIGS. 5 and 6. More specifically, upper portion 25 of torso web piece 12 overlaps front shoulder web panel 32 of shoulder web piece 14 such that top edge 16 of torso web piece 12 and top edge 36 of shoulder web piece 14 are substantially aligned. However, in various embodiments, top edge 16 of torso web piece 12 may not align with top edge 36 of shoulder web piece 36. Where top edge 16 of torso web piece 12 does not align with top edge 36 of shoulder web piece 36, torso web piece 16 may not include neck opening 19. In FIGS. 1A-1E, front and rear bottom edges 38, 42 of shoulder web piece 14 are positioned adjacent lower portion 27 of torso web piece 12 where extended portions 21, 23 begin. However, in some embodiments, front and rear bottom edges 38, 42 of shoulder web 14 may be positioned in a different area of torso web piece 12 in either upper portion 25 or lower portion 27. Coupling material 60 may be applied to upper portion 25 of torso web piece 12 and/or front shoulder web panel 32 of shoulder web piece 14. As non-limiting examples, coupling material 60 may be an adhesive layer or coating, tape, or a heat-activated substance.

Referring now to FIGS. 5-6, portions of an exemplary manufacturing line 90 for manufacturing multi-piece open-back isolation gowns 10 and associated production flow 91 is illustrated, according to an embodiment of the invention. FIG. 5 illustrates the machinery in manufacturing line 90 for performing a method of manufacturing multi-piece open-back isolation gowns 10. FIG. 6 illustrates how webs may be manipulated and combined into multi-piece open-back isolation gown 10 of FIGS. 1A-1E including torso web piece 12 and shoulder web piece 14 in manufacturing line 90. While FIG. 6 illustrates the torso web piece 12 with the specific tie strap configuration of FIGS. 1A, 1B, and 2, manufacturing line 90 may alternatively produce torso web piece 12 with the tie strap configuration of FIG. 1C, 1D, or 1E.

Referring to FIGS. 5 and 6, manufacturing line 90 includes a torso web piece section 96 that forms torso web pieces 12, a shoulder web piece section 98 that forms shoulder web pieces 14, and an isolation gown section 100 that forms multi-piece open-back isolation gowns 10 from torso web pieces 12 and shoulder web pieces 14. In general, manufacturing line 90 performs operations along a machine direction 92, but also performs operations in a cross-machine direction 94 that is perpendicular to machine direction 92. In order to facilitate the formation of torso web pieces 12, a continuous torso web 102 is fed into torso web piece section 96 in machine direction 92. Continuous torso web 102 may be fed into torso web piece section 96 via a turnbar infeed process during which continuous torso web 102 is unwound from a roll (not shown).

Continuous torso web 102 is then directed past at least one roller 104 to an optional perforation unit or apparatus 106 including a rotary anvil 108 aligned with a rotary knife roll 110 having one or more knives 112. Each knife 112 may be positioned within an insert (not shown) on rotary knife roll 110 and arranged to align with a corresponding insert (not shown) inset within rotary anvil 108 during operation of perforation unit 106. Perforation unit 106 may be included in order to cut perforation lines in continuous torso web 102 in order to define one or more tie straps. As a non-limiting example, perforation unit 106 may be configured to cut perforation lines 28, 30 in continuous torso web 102 in order to define tie straps 24, 26, as shown in FIG. 6. In other embodiments, perforation unit 106 may be configured to cut perforation lines 28, 30 shown in FIG. 1C or 1D or perforation line 31 shown in FIG. 1E. In yet other embodiments, perforation unit 106 may be a cutting unit that cuts tie straps off of continuous torso web 102 for reattachment to torso web pieces 12 later in manufacturing line 90. Further, tie straps may also be made offline from a web separate from continuous torso web 102 and attached to torso web pieces 12 in manufacturing line 90 or packaged as unattached strips with completed gowns 10.

After passing through perforation unit 106, continuous torso web 102 may be folded in cross-machine direction 94 by an optional folding unit or apparatus 114 to make torso web pieces 12 easier to manipulate once they are separated from continuous torso web 102. Folding unit 114 may include belts, rotary wheels, discs, rollers, fixed rods or plates of various shapes (flat or three-dimensional) and/or other known folding technologies. As shown in FIG. 6, folding unit 114 is configured to fold bottom edge 18 on continuous torso web 102 toward top edge 16 on continuous torso web 102 to create a folded edge 113 and an area 115 of overlap in continuous torso web 102. The fold performed by folding unit 114 on continuous torso web 102 aids in packing isolation gowns 10, as will be described in more detail below with respect to isolation gown section 100 of manufacturing line 90. Folding unit 114 may be omitted in alternate embodiments.

Once continuous torso web 102 is folded, it is fed to a die and/or torso cutting unit or apparatus 116, such as a rotary die, knife roll with rotary anvil, laser technology, ultrasonic technology, or other known cutting means. Unit 116 is configured to die cut excess torso web material 117 in continuous torso web 102 to create extended areas 21, 23. In the illustrated embodiment, manufacturing line 90 includes an optional torso cutting unit or apparatus 118 that cuts torso pieces 12 from continuous torso web 102. Units 116, 118 are shown in FIG. 5 with similar components as perforation unit 106 including rotary anvil 108 aligned with rotary knife roll 110 having one or more knives 112. However, in unit 116, each knife 112 is configured to die cut excess torso web material 117 from continuous torso web 102 and in unit 118, each knife 112 on rotary knife roll 110 is configured to completely separate discrete torso web pieces 12 at a cut line 119 shown in FIG. 6. In an alternate embodiment, the functionality of units 116 and 118 may be combined in a single unit 116, with the knife roll 110 configured to die cut excess torso web material 117 and create cut lines 119 to separate discrete torso web pieces 12 from continuous torso web 102. While FIG. 5 illustrates units 116, 118 positioned downstream of folding unit 114 in manufacturing line 90, the locations of folding unit 114 and cutting units 116, 118 may be switched such that cutting unit 116 or 118 cuts discrete torso web pieces 12 from continuous torso web 102 and then folding unit 114 folds discrete torso web pieces 12 rather than continuous torso web 102.

As shown in FIGS. 5 and 6, shoulder web piece section 98 operates simultaneously with torso web piece section 96. To begin, at least one continuous shoulder web 120 is fed into shoulder web piece section 98 of manufacturing line 90 in machine direction 92. Continuous shoulder web(s) 120 may be fed into shoulder web piece section 98 via a turnbar infeed process during which continuous torso web 120 is unwound from a roll (not shown) and directed past at least one roller 122. Continuous shoulder web 120 is then directed to an optional die and/or perforation unit or apparatus 128, such as a rotary die, knife roll with rotary anvil, laser technology, ultrasonic technology, or other known cutting means. In FIG. 5, die and/or perforation unit 128 includes rotary anvil(s) 108 and rotary knife roll(s) 110 with one or more knives 112. Die and/or perforation unit 128 may optionally cut perforation lines 39 and thumb openings 41 in continuous shoulder web 120. In one embodiment, die and/or perforation unit 128 includes a single rotary anvil 108/rotary knife roll 110 pair with knives 112 configured to cut neck openings 19, perforation lines 39, and thumb openings 41. In such an embodiment, die and/or perforation unit 128 may be cammed to create neck openings 19, perforation lines 39, and thumb openings 41 at the desired spacing. In an alternate embodiment, die and/or perforation unit 128 includes two or more separate rotary anvil 108/rotary knife roll 110 pairs, spaced in the machine direction 94, for cutting neck openings 19, perforation lines 39, and thumb openings 41. Any or all of the separate rotary anvil 108/rotary knife roll 110 pairs may be cammed. Thumb openings 41 may also be cut from continuous shoulder web 120 later in manufacturing line 90, as described in more detail below.

After passing through die and/or perforation unit 128, continuous shoulder web 120 is folded in cross-machine direction 94 by a folding unit or apparatus 130. Folding unit 130 may include belts, rotary wheels, discs, rollers, fixed rods or plates of various shapes (flat or three-dimensional) and/or other known folding technologies. As shown most clearly in FIG. 6, the fold in continuous shoulder web 120 is performed to define front and rear shoulder web panels 32, 34 of shoulder web pieces 14 in FIGS. 1A-1E, 3, and 4 with folded top edge 36. In an alternative embodiment, folding unit 130 is positioned upstream of the die and/or perforation unit 128 that creates neck openings 19.

Once folded, continuous shoulder web 120 passes through bonding unit or apparatus 132. In FIG. 5, bonding unit 132 is shown as an ultrasonic bonding unit 132 including a rotary anvil 134 and an ultrasonic fixed blade horn or sonotrode 136 for creating a seam using ultrasonic bonding. However, bonding unit 132 may alternatively include components for creating the seam via a different bonding technique such as, for example, thermal, pressure, or adhesive bonding techniques or various other forms of bonding known in the industry. Regardless, bonding unit 132 bonds front and rear shoulder panels 32, 34 to create underarm seams in continuous shoulder web 120. As shown in FIG. 6, the underarm seams may be, for example, underarm seams 46 shown in shoulder web piece 14 of FIGS. 1A-1E, 3, and 4.

After passing through bonding unit 132, continuous shoulder web 120 passes through a die unit or apparatus 138 including rotary anvil 108 and knife roll 110 with one or more knives 112. Die unit 138 is configured to remove excess underarm web material 140 from continuous shoulder web 120. An applicator 142 then applies coupling material 60 to front panels 32 of continuous shoulder web 120 before continuous shoulder web 120 travels into isolation gown section 100. Coupling material 60 may be in the form of adhesive strips, an adhesive spray, tape, or a heat-activated substance, as non-limiting examples. After the application of coupling material 60, continuous shoulder web 120 is directed to isolation gown section 100.

However, as an alternative to using a single continuous shoulder web 120, shoulder web piece section 98 may include an alternate configuration 144 in which utilizes two separate continuous shoulder webs 120a, 120b are provided and bonded together. If configuration 144 of shoulder web piece section 98 is used in manufacturing line 90, shoulder web piece section 98 will receive front and rear continuous shoulder webs 120a, 120b that are approximately half as wide as continuous shoulder web 120. Front and rear continuous shoulder webs 120a, 120b will pass through separate optional die and/or perforation units 128a, 128b, respectively. Die and/or perforation unit 128a is configured to thumb openings 41 in front continuous shoulder web 120a. Die and/or perforation unit 128b is configured to create neck perforation line(s) 39 and/or thumb openings 41 in rear continuous shoulder web 120b. However, as similarly explained above, thumb openings 41 may be formed later in manufacturing line 90, as will be explained in more detail below.

Thereafter, front and rear continuous shoulder webs 120a, 120b are laid on top of each other such that there is an area of overlap (not shown) therebetween. Next, front and rear continuous shoulder webs 120a, 120b are passed through a bonding unit 146. In FIG. 5, bonding unit 146 is shown as an ultrasonic bonding unit 146 including rotary anvil 134 and sonotrode 136 that cooperate to create seams in front and rear continuous shoulder webs 120a, 120b. However, bonding unit 146 may include equipment for performing another bonding technique such as, for example, sonic, thermal, pressure, or adhesive bonding.

In some embodiments, the top edge of the front continuous shoulder web 120a overlaps a small portion of the top edge of the rear continuous shoulder web 120b, with the outward-facing surface of the front continuous shoulder web 120a positioned atop the user-facing or inward-facing surface of the rear continuous shoulder web 120b, and bonding unit 146 is configured to bond front and rear continuous shoulder webs 120a, 120b together to create a seam in the area of overlap. After passing through bonding unit 146, front and rear continuous shoulder webs 120*a*, 120*b* are directed along path 141 via roller 143. In alternative embodiments, the user-facing surfaces of the front and rear continuous shoulder webs 120*a*, 120*b* are positioned facing each other and are positioned to overlap such that the top edges and the bottom edges of the front and rear continuous shoulder webs 120*a*, 120*b* are substantially aligned. In that case, bonding unit 146 is configured to bond front and rear shoulder panels 120*a*, 120*b* together to create a seam adjacent their top edges (not shown) and to create underarm seams 46. Thereafter, front and rear continuous shoulder webs 120*a*, 120*b* are directed along path 145 via roller 147. Regardless of the area of overlap between front and rear continuous shoulder webs 120*a*, 120*b*, the result of the bonding is that the combined front and rear continuous shoulder webs 120*a*, 120*b* are arranged similarly to single continuous shoulder web 120 at corresponding paths 141, 145, but with the inclusion of the additional seam between front and rear continuous shoulder webs 120*a*, 120*b* adjacent the top edge 36 of the shoulder web pieces 14. As such, the combined front and rear continuous shoulder webs 120*a*, 120*b* will also be referred to as continuous shoulder web 120 throughout.

As illustrated by FIGS. 5 and 6, after torso web piece section 96 and shoulder web piece section 98 have completed their operations, torso web pieces 12 and continuous shoulder web 120 are provided by torso and shoulder web piece sections 96, 98, respectively, to isolation gown section 100. Isolation gown section 100 includes a torso web piece transfer unit or apparatus 148 including two vacuum transfer drums or rolls 150, 152. In each of vacuum transfer drums 150, 152, a vacuum is drawn through holes (not shown) to carry torso web pieces 12 and transfer them to continuous shoulder web 120. More specifically, vacuum transfer drum 150 receives torso web pieces 12 from torso web piece section 96 and carries them in a direction 154 until they reach vacuum transfer drum 152, at which point, vacuum transfer drum 150 releases torso webs 12 and vacuum transfer drum 152 carries them in a counter direction 156 to continuous shoulder web 120. Torso web pieces 12 are positioned on continuous shoulder web 120 such that upper portion 25 of each torso web piece 12 overlaps continuous shoulder web 120, with top edge 16 of each torso web piece 12 being substantially aligned with top edge 36 of continuous shoulder web panel 120. In addition to transferring torso web pieces 12 onto continuous shoulder web 120, transfer unit 148 may also re-pitch torso web pieces 12, such as by using known cut and slip technology, in order to create separation between them for their placement onto a continuous shoulder web 120. Alternatively, an optional re-pitching unit (not shown) may be included upstream from transfer unit 148 to re-pitch torso web pieces 12. In yet other embodiments, multiple re-pitching units may be positioned before and/or after transfer unit 148 to re-pitch the discrete torso web pieces 12 prior to transfer to continuous shoulder web 120.

In an alternative embodiment, transfer unit 148 may be in the form of a unit that takes the place of vacuum rolls 150, 152. The unit may be in the form of a cam-based system (not shown) in which a plurality of vacuum pucks (not shown) may re-pitch and/or rotate discrete torso web pieces 12 and place them onto continuous shoulder web 120. The unit may also be a track-based system (not shown) in which a plurality of vacuum pucks (not shown) on a track re-pitch and/or rotate discrete torso web pieces 12 and place them onto continuous shoulder web 120. In the track-based system, the vacuum pucks may be controlled individually by separate drive elements on the track and could then be more easily reconfigured electronically as necessary.

Upon transfer of torso web pieces 12 onto continuous shoulder web 120, torso web piece 12 are bonded to continuous shoulder web 120 via coupling material 60. In some embodiments, isolation gown unit 100 may optionally include nip rollers (not shown) that press torso web pieces 12 and continuous shoulder web 120 together. However, the pressing of torso web pieces 12 onto continuous shoulder web 120 may also be performed by vacuum roll 152 or a vacuum puck of transfer unit 148. After torso web pieces 12 and continuous shoulder web 120 are bonded together, the combined structure may be considered as a continuous isolation garment web-referred to hereafter as isolation gown web 158.

Continuous isolation gown web 158 is directed to an optional folding unit or apparatus 160 including belts, rotary wheels, discs, rollers, fixed rods or plates of various shapes (flat or three-dimensional) and/or other known folding technologies. When used, folding unit 160 is configured to fold the lower edge (either bottom edge 18 or folded edge 113) on each torso web piece 12 toward top edge 16 of each torso web piece 12 and top edge 36 of continuous shoulder web 120. The folded lower edge of torso web pieces 12 is spaced away from top edge 16 of torso web piece 12. In the illustrated embodiment, gown web 158 is then passed to a neck and/or wrist cutting unit or apparatus 162 including rotary anvil 108 and rotary knife roll 110 with one or more knives 112 configured to cut out neck openings 19, 37 in torso web pieces 12 and continuous shoulder web 120, respectively. In alternate embodiments, isolation gown section 100 may include an optional neck cutting unit or apparatus (not shown) between transfer unit 148 and folding unit 160 to cut neck openings 19, 37 such that folding unit 160 may be configured to fold folded edge 113 all the way to top edge 16 of torso web pieces 12 and top edge 36 of continuous shoulder web 120.

Regardless, neck and/or wrist cutting unit 162 is configured to cut out wrist openings 52, 54 in continuous shoulder web 120 and may optionally cut out thumb openings 41 in continuous shoulder web 120 if they have not been cut out in shoulder web piece section 98, as described above. Neck and/or wrist cutting unit 162 may also be configured to separate continuous isolation gown web 158 into discrete multi-piece open-back isolation gowns 10 including torso web piece 12 and shoulder web piece 14 at cut lines 164. FIG. 6 illustrates isolation gowns 10 with torso web piece 12 and shoulder web pieces 14, as similarly shown in FIGS. 1A-1E. Alternatively, neck and/or wrist cutting unit 162 may create cut lines 164 as perforation lines 164 when it is desired to package continuous isolation gown web 158 in a roll from which an individual may tear discrete isolation gowns 10 as needed.

Once neck and/or wrist cutting unit 162 has created neck, thumb, and/or wrist openings 19, 37, 41, 52, 54 and/or cut continuous isolation gown web 158 into discrete isolation gowns 10, continuous isolation gown web 158 or discrete isolation gowns 10 pass through a multi-stage folding unit or apparatus 166. As non-limiting examples, multi-stage folding unit 166 may include multiple folding stations such as, for example, three tuckers (not shown) or multiple pairs of rotating folding blades (not shown) that perform a tri-fold operation on each isolation gown 10 to make them ready for packaging, as shown in FIG. 6. While a tri-fold configuration is described herein, it is contemplated that multi-stage folding unit 166 may be configured to create any number of folds in each isolation gown 10 to create the desired package shape. However, if continuous isolation gown web 158 has not been separated into discrete isolation gowns 10, continuous isolation gown web 158 may be fed into a rewinder (not shown) and rolled up or rewound for packaging in an isolation gown web dispenser (not shown) from which discrete isolation gowns 10 may be torn, as described above.

FIGS. 7-13 illustrate respective rear perspective, rear, front, right side, left side, top, and bottom views of the multi-piece open-back isolation garment 10. The multi-piece open-back isolation garment is not limited to the scale shown in FIGS. 7-13.

Beneficially, embodiments of the invention include an apparatus and method of manufacturing multi-piece open-back isolation garments having a torso web piece that spans the vertical length of the garment and a shoulder web piece. In manufacturing the shoulder web pieces, front and rear shoulder panels are formed by either folding one continuous shoulder web and bonding the overlapping shoulder web layers at the underarm seams or by bonding two narrower continuous shoulder webs together along their top edge and at the underarm seams. A die unit and/or a cutting unit cuts excess web torso web material from a continuous torso web and cuts discrete torso web pieces from the continuous torso web. An applicator applies a coupling material to at least one of the continuous shoulder web and the discrete torso web pieces, and a transfer unit transfers the discrete torso web pieces onto the continuous shoulder web in order to bond the discrete torso web pieces to the continuous shoulder web with the coupling material and form a continuous multi-piece open-back isolation garment web. A die unit cuts out neck, wrist, and/or thumb openings in isolation garment web before isolation garment web is folded. Isolation garment web may be rewound into a roll or cut to form discrete isolation garments for folding and packaging. The manufacturing of the multi-piece open-back isolation garments can quickly produce the isolation garments without manual input and with only a small amount of scrap material. The formation of the torso web pieces and the shoulder web pieces results in only minimal scrap material from cutting out neck, wrist, and/or thumb openings, excess torso web material, and excess underarm material.

Therefore, according to one embodiment of the invention, an apparatus for manufacturing multi-piece open-back isolation garments includes a bonding unit configured to create underarm seams between first shoulder web panels and second shoulder web panels overlapping each other in a continuous shoulder web, a torso cutting unit configured to cut discrete torso web pieces from a continuous torso web, and an applicator configured to apply a coupling material onto at least one of the first shoulder panels of the continuous shoulder web and the discrete torso pieces. The apparatus additionally includes a transfer unit configured to transfer the discrete torso web pieces onto the coupling material on the first shoulder web panels of the continuous shoulder web, the coupling material bonding the discrete torso web pieces to the first shoulder web panels of the continuous shoulder web to create a continuous isolation garment web.

According to another embodiment of the present invention, a method of manufacturing multi-piece open-back isolation garments includes forming first shoulder web panels and second shoulder web panels overlapping each other in a continuous shoulder web and creating underarm seams between the first and second shoulder web panels. The method also includes cutting a continuous torso web into discrete torso web pieces, applying a coupling material to at least one of the first shoulder web panels and the discrete torso web pieces, and transferring the discrete torso web pieces onto the coupling material on the first shoulder web panels to bond the discrete torso web pieces to the first shoulder web panels and create a continuous isolation garment web.

According to yet another embodiment of the present invention, a multi-piece garment includes a shoulder web piece having first and second shoulder web panels each comprising a bottom edge and a pair of underarm edges extending out from the bottom edge, a pair of underarm seams joining the first and second shoulder web panels at adjacent underarm edges of the first and second shoulder web panels to form first and second sleeves in the shoulder web piece, and a neck opening formed in the first and second shoulder web panels across from the bottom edges of the first and second shoulder web panels. The multi-piece garment further includes a torso web piece overlapping the first shoulder web panel of the shoulder web piece, the torso web piece bonded to the first shoulder web panel via a coupling material positioned between a top edge of the torso web piece and the bottom edge of the first shoulder web panel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A method of manufacturing multi-piece open-back isolation garments, the method comprising:

forming first shoulder web panels and second shoulder web panels overlapping each other in a continuous shoulder web;

creating underarm seams between the first and second shoulder web panels;

cutting a continuous torso web into discrete torso web pieces;

applying a coupling material to at least one of the first shoulder web panels and the discrete torso web pieces;

transferring the discrete torso web pieces having an upper portion in an unfolded state onto the coupling material on the first shoulder web panels to bond the discrete torso web pieces having the upper portion in the unfolded state to the first shoulder web panels and create a continuous isolation garment web.

2. The method of claim 1 further comprising cutting at least one of neck openings and wrist openings in the continuous shoulder web of the continuous isolation garment web.

3. The method of claim 1 wherein applying the coupling material comprises applying at least one of an adhesive layer, tape, and a heat-activated substance.

4. The method of claim 1 further comprising cutting the continuous shoulder web into discrete shoulder web pieces to form discrete multi-piece open-back isolation garments.

5. The method of claim 4 further comprising folding the multi-piece open-back isolation garments in multiple stages.

6. The method of claim 1 further comprising rewinding the continuous isolation garment web.

7. The method of claim 1 wherein forming the first and second shoulder web panels comprises folding the continuous shoulder web.

8. The method of claim 1 wherein forming the first and second shoulder web panels comprises bonding a first continuous shoulder web to a second continuous shoulder web.

9. The method of claim 1 further comprising cutting excess torso material from the continuous torso web to create extended areas in side edges of the discrete torso web pieces.

10. The method of claim 9 further comprising forming a plurality of perforation lines in the continuous torso web to create at least one tie strap adjacent to at least one of the side edges in each discrete torso web piece.

11. The method of claim 1 further comprising folding a lower portion of the torso piece before transferring the discrete torso web pieces having the upper portion in the unfolded state onto the coupling material on the first shoulder web panels to bond the discrete torso web pieces having the upper portion in the unfolded state to the first shoulder web panels and create the continuous isolation garment web.

12. The method of claim 11 wherein folding the lower portion of the torso piece involves folding the lower portion of the torso piece perpendicular to a machine direction of an apparatus performing the method and in an unbonded region of the torso piece.

\* \* \* \* \*